June 9, 1925.   1,540,781

C. W. KEUFFEL

MOUNT FOR CONDENSER LENSES

Filed Nov. 6, 1922

Inventor
Carl W. Keuffel
By his Attorney
Clarence G. Campbell

Patented June 9, 1925.

1,540,781

UNITED STATES PATENT OFFICE.

CARL W. KEUFFEL, OF WEEHAWKEN TOWNSHIP, HUDSON COUNTY, NEW JERSEY, ASSIGNOR TO KEUFFEL & ESSER CO., OF HOBOKEN, NEW JERSEY, A CORPORATION OF NEW JERSEY.

MOUNT FOR CONDENSER LENSES.

Application filed November 6, 1922. Serial No. 599,257.

*To all whom it may concern:*

Be it known that I, CARL W. KEUFFEL, a citizen of the United States, residing at the township of Weehawken, in the county of Hudson and State of New Jersey, have invented certain new and useful Improvements in a Mount for Condenser Lenses, of which the following is a specification.

My invention relates to a mount and guard for a condenser lens, and the novelty consists in the adaptation and arrangement of parts, as will be more fully hereinafter pointed out.

For economic and sometimes for practical manufacturing reasons, a condensing lens is made smaller than the holder used in the type of projection machine now most widely used in this art. Such lenses are therefore not adapted to such projection machines, although they are often superior as condensers and are materially cheaper to make.

My device is adapted to make such lenses available for use in projecting machines so that they can be so used without the heavy expense of making a new condenser holder for said machines. My device is also adapted to carry a transparent guard plate so as to protect the condenser lens from being pitted or scarred by the arc lamps used in such projection machines, and to enable the condenser lens to be placed close to the arc lamp so as to get all of the available light.

Figure 1:
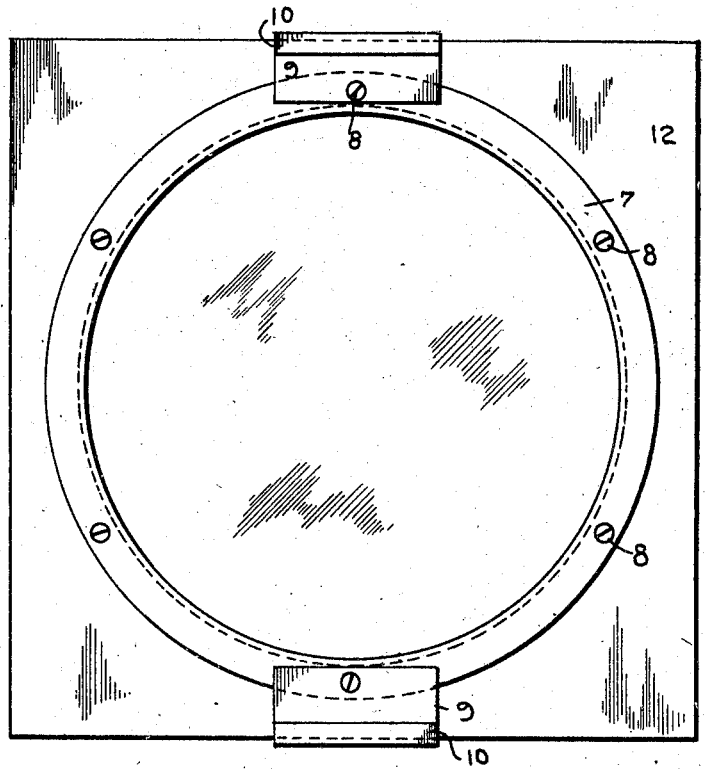
Figure 2:
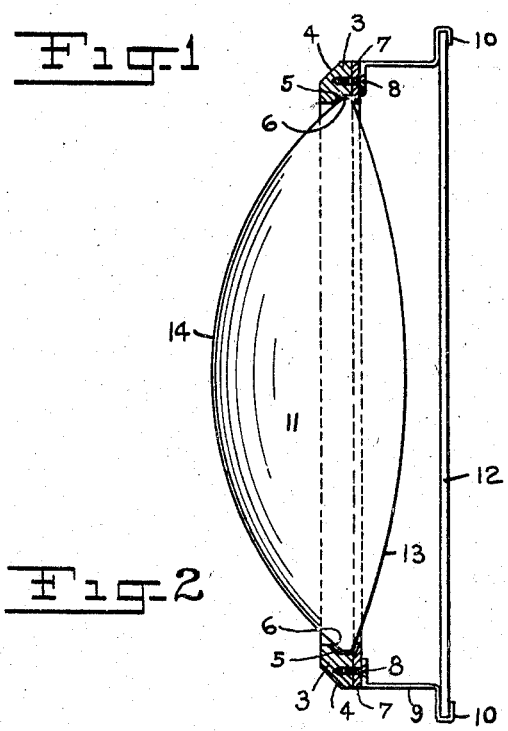

Referring to the drawings Figure 1 is a front elevation of my device; and Figure 2 is a side elevation of the same with the mount in section.

In the drawings 3 is a circular metal holder member having a beveled face 4 and an interior circular groove 5 in which is an asbestos or other heat insulating liner 6. A circular metal retaining plate 7 is adapted to be removably secured to said holder member 3 by means of screws 8, and brackets 9 are also adapted to be secured to said holder 3 by said screws 8. Said brackets 9 terminate in hooked lips 10 at their outer ends.

The circular holder member 3 is adapted to receive a condensing lens 11 which will fit into the same so that the outer circular edge of said lens 11 will rest on the heat insulating liner 6, and said liner 6 will prevent the heat from the holder member 3 from being quickly transferred to the lens 11 as the holder 3 is heated through its proximity to the light source in the projection machine, and thereby prevents breaking of lens 11 because of quick temperature changes. The circular retaining plate 7 is then adapted to be secured in position by means of screws 8 so as to hold the lens 11 in the holder member 3.

A transparent guard plate 12 is adapted to be mounted in the hooked lips 10 of the brackets 9 so as to protect a face 13 of the lens 11 which is exposed to the source of light in the projection machine when the holder member 3 is in position for use, and to permit of said lens 11 being placed closer to the source of light.

A holder member 3 has the beveled face 4 which enables the lens 11 to centre itself in the lens holder now in use in most projection machines so that face 14 of said lens 11 will be away from the light source, and face 13 with the guard plate 12 will be next to said light source.

I claim:

1. In a mount for a condenser lens the combination of a holder member having a heat insulating lining and a retaining plate removably secured to said holder member which is adapted to fit the ordinary condenser holder of projection machines, and brackets removably mounted on said holder member and a transparent guard plate mounted in said brackets.

2. In a mount for a condenser lens the combination of a holder member and a retaining plate removably secured to said holder member which are both adapted to fit the ordinary condenser holder of projection machines, and brackets removably mounted on said retaining plate and holder member and a transparent guard plate mounted in the outer end of said brackets and spaced thereby from said holder member and lens mounted between the said holder member and guard plate.

In testimony whereof I affix my signature.

CARL W. KEUFFEL.